(12) United States Patent
Chimmalgi et al.

(10) Patent No.: US 11,104,061 B2
(45) Date of Patent: Aug. 31, 2021

(54) STEREOLITHOGRAPHY APPARATUS WITH INDIVIDUALLY ADDRESSABLE LIGHT SOURCE ARRAYS

(71) Applicant: Carbon, Inc., Redwood City, CA (US)

(72) Inventors: Anant Chimmalgi, Los Altos, CA (US); Jean-Claude De Sugny, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 15/733,454

(22) PCT Filed: May 13, 2019

(86) PCT No.: PCT/US2019/032005
§ 371 (c)(1),
(2) Date: Jul. 31, 2020

(87) PCT Pub. No.: WO2019/222094
PCT Pub. Date: Nov. 21, 2019

(65) Prior Publication Data
US 2020/0361140 A1 Nov. 19, 2020

Related U.S. Application Data

(60) Provisional application No. 62/671,109, filed on May 14, 2018, provisional application No. 62/834,734, filed on Apr. 16, 2019.

(51) Int. Cl.
*B29C 64/135* (2017.01)
*B33Y 10/00* (2015.01)
(Continued)

(52) U.S. Cl.
CPC .......... *B29C 64/135* (2017.08); *B29C 64/268* (2017.08); *B29C 64/393* (2017.08); *B33Y 10/00* (2014.12); *B33Y 50/02* (2014.12)

(58) Field of Classification Search
CPC .................................................. B29C 64/135
See application file for complete search history.

(56) References Cited

U.S. PATENT DOCUMENTS

2017/0182707 A1* 6/2017 Moroni .................. B33Y 50/02

FOREIGN PATENT DOCUMENTS

| WO | 2014126834 | 8/2014 |
| WO | 2016207777 | 2/2016 |
| WO | 2017109764 | 6/2017 |

OTHER PUBLICATIONS

International Search Report and the Written Opinion of the International Searching Authority corresponding to International Patent Application No. PCT/US2019/032005 (13 pages) (dated Aug. 7, 2019).

* cited by examiner

*Primary Examiner* — Larry W Thrower
(74) *Attorney, Agent, or Firm* — Myers Bigel, P.A.

(57) ABSTRACT

A bottom-up stereolithography apparatus includes a frame; a light-transmissive window the window having a top surface portion; a drive assembly connected to the frame (and in some embodiments positioned above the light-transmissive window); a micro-LED or a vertical cavity surface emitting laser (VCSEL) source array to the frame and positioned below the light-transmissive window; and a controller operatively associated with the drive assembly and the source array, the controller configured for producing an object on the elevator assembly from a polymerizable resin on the window by bottom-up stereolithography.

16 Claims, 3 Drawing Sheets

(51) Int. Cl.
*B33Y 50/02* (2015.01)
*B29C 64/393* (2017.01)
*B29C 64/268* (2017.01)

STEREOLITHOGRAPHY APPARATUS WITH INDIVIDUALLY ADDRESSABLE LIGHT SOURCE ARRAYS

RELATED APPLICATIONS

This applications application is a 35 U.S.C. § 371 national phase entry of International Application No. PCT/US2019/032005, filed May 13, 2019, which claims priority to U.S. Provisional Application Ser. No. 62/671,109, filed May 14, 2018 and 62/834,734, filed Apr. 16, 2019, the disclosures of which are hereby incorporated by reference in their entirety.

FIELD OF THE INVENTION

The present invention concerns methods and apparatus for of additive manufacturing, particularly for carrying out bottom-up stereolithography with a light-polymerizable resin.

BACKGROUND

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

These developments have created a need for new and improved designs for additive manufacturing apparatus suitable to high-through-put manufacturing environments, as opposed to prototyping environments.

SUMMARY

A first aspect of the present invention is a bottom-up stereolithography apparatus, comprising: a frame; a light-transmissive window the window having a top surface portion; a drive assembly connected to the frame (and in some embodiments positioned above the light-transmissive window); a micro-LED or a vertical cavity surface emitting laser (VCSEL) source array to the frame and positioned below the light-transmissive window; and a controller operatively associated with the drive assembly and the source array, the controller configured for producing an object on the elevator assembly from a polymerizable resin on the window by bottom-up stereolithography.

In some embodiments the light-transmissive window comprises a polymer layer (e.g., a fluoropolymer layer), which polymer layer is permeable to an inhibitor of polymerization (e.g., oxygen).

In some embodiments, the apparatus further includes an inhibitor supply (e.g., an oxygen supply) operatively associated with the window.

In some embodiments, the apparatus further includes a carrier plate removably connected to the elevator assembly, the carrier plate having a bottom surface portion facing the window top surface portion, on which bottom surface portion an object may be produced.

In some embodiments, the source array emits at a wavelength, or peak wavelength, of from 360 nanometers to 400 or 450 nanometers.

In some embodiments, the source array and window are configured together to provide a resolution of (i) from 100, 200, 400, 600 or 800 pixels per inch (ppi), to 2000 or 3000 ppi, or more, or (ii) from 40, 80, 160, 240, or 310 pixels per centimeter (ppcm) to 800 or 1200 ppcm, or more (optionally with each LED or VCSEL in the source array corresponding to one of the pixels).

In some embodiments, the window has at least one variable property, and the apparatus further includes: either (i) a unique identifier reader (e.g., an NFC tag reader) operatively associated with the controller and configured for reading a unique identifier on the window cassette, or (ii) a data storage media coupling (e.g., a USB coupling) operatively associated with the controller and configured for coupling to a data storage media on the window cassette.

In some embodiments, the apparatus may be configured according to any of the following: (i) the source array is positioned to project directly through the window into a build region of a polymerizable resin on the window; (ii) the apparatus further comprises an optical array through which the source array projects (e.g., a lenslet array; a collimating lens array, a Fresnel lens array, and/or a diffractive optical element array; etc.) (and optionally with each individual element of the optical array corresponding 1 to 1 to each individual element of the source array); (iii) a projection lens is positioned between the source array and the window (e.g., the projection lens configured to steer light from the source array into corresponding regions of the polymerizable resin); (iv) a steerable mirror operatively associated with the VCSEL array and configured to project light from the source into a build region of a polymerizable resin on the window, (e.g., with the steerable mirror configured to direct the beam from the VCSEL array to specific subregions of the build region in a sequential manner); (v) a steerable mirror and a projection lens operatively associated with the micro-LED array, and configured so that the light from the source is rendered telecentric by the projection lens, with the steerable mirror configured to project light from the source into a build region of a polymerizable resin on the window (e.g., with the steerable mirror configured to direct the beam from the micro-LED array to specific subregions of the build region in a sequential manner); and (vi) a combination of any of the foregoing.

A second aspect of the invention is a method of making an object on a bottom-up stereolithography apparatus, the apparatus including a micro-LED or a vertical cavity surface emitting laser (VCSEL) source array, a drive assembly, and a controller operatively associated with the source array and the drive assembly, with the source array and/or the drive assembly having at least one adjustable parameter that is adjustable by the controller, the method including the steps of: (a) installing a removable window cassette on the apparatus in a configuration through which the micro-LED or VCSEL source array projects, the window cassette comprising an optically transparent member having a build surface on which an object can be produced, and with the optically transparent member having and at least one variable property therein; and then (b) modifying the at least one adjustable parameter by the controller based on the at least one variable optical property of the window; and then (c) producing the object on the build surface from a light-polymerizable liquid by bottom-up stereolithography.

In some embodiments of the foregoing method, the window cassette includes a unique identifier (e.g., a bar code, QR code, NFC tag, etc.) operatively associated therewith, and the modifying step is carried out by: (i) detecting the unique identifier (e.g., with a unique identifier reader), and then (ii) transferring (e.g., over the internet) optical correction instructions for the at least one variable optical property and corresponding to the unique identifier from a data storage media (e.g., a cloud database) to the controller.

In other embodiments of the foregoing method, the window cassette includes a data storage media thereon (e.g., a flash drive), the data storage media containing optical correction instructions for the at least one variable optical property; and the modifying step is carried out by: (i) operatively associating the storage media with the controller (e.g., through a USB interface) and then (ii) transferring the optical correction instructions from the data storage media to the controller.

In some embodiments of the foregoing method, the variable property comprises an optical property, a physical property (e.g., permeability to an inhibitor of polymerization), or a combination thereof.

In some embodiments, the variable property comprises window thickness or window height (mechanical location of the top of the window when mounted on the apparatus), and the adjustable parameter comprises projected image magnification (for the entirety of an image and/or portions thereof) and/or source array focal plane.

In some embodiments, the variable property comprises window light transmissiveness (e.g., one or more discrete blemishes; a tansmissiveness gradient; etc.) and the adjustable property comprises light intensity (e.g., greater intensity in regions with less light transmissiveness).

In some embodiments, the variable property comprises an optical defect region, and the adjustable parameter comprises a projection region to the build surface (e.g., an excluded region or "no print zone" for production of an object on that build surface).

In some embodiments, the variable property comprises regional optical distortions in the window, and the adjustable parameter comprises regional optical corrections of the projected light image that are mapped to the regional optical distortions.

In some embodiments, the variable property comprises permeability to an inhibitor of polymerization (e.g., oxygen), and the adjustable parameter comprises light intensity, speed of production, or a combination thereof.

In some embodiments, each the adjustable parameter is independently applied to one or more minor portions of the window, a major portion of the window, or the entirety of the window, or a combination thereof.

In some embodiments of the foregoing, the light transmissive member comprises a plurality of distinct layers.

In some embodiments, the light-transmissive member includes: (i) a rigid or flexible, semi-permeable or impermeable, support member; (ii) either a semipermeable member on the support member (e.g., a fluoropolymer member) or an immiscible layer (e.g., a hydrogel) on the support member; (iii) an inhibitor of polymerization (e.g., oxygen) in the semipermeable member when present; (iii) optionally but preferably, a cushioning member between the impermeable support member and the semipermeable member; and (v) optionally but preferably, feed space (e.g., feed channels) between the impermeable support member and the semipermeable member (e.g., in or on the cushioning member), the feed space configured for supplying additional inhibitor of polymerization (e.g., oxygen) into the semipermeable member.

In some embodiments, the modifying step enhances at least one performance characteristic of the apparatus (e.g., by reducing the frequency of production failures thereon, such as by enhancing accuracy of object production thereon, reducing defect formation in objects produced thereon, etc., including combinations thereof).

In some embodiments, the producing step is carried out by continuous liquid interface production (CLIP).

B. Feller et al., *Build plate assemblies for continuous liquid interphase printing having lighting panels and related methods, systems and devices*, PCT Application WO 2017/053783 (30 Mar. 2017), neither describes nor suggests micro-LEDs for additive manufacturing.

Dudley and Tersigni, 3*D printing using rotational components and improved light sources*, U.S. Patent Application No. US 2018/0215092 (Published Aug. 2, 2018), describes VCSEL arrays as a light source in a heliolithography system.

The foregoing and other objects and aspects of the present invention are explained in greater detail in the drawings herein and the specification set forth below. The disclosures of all United States patent references cited herein are to be incorporated herein by reference.

DETAILED DESCRIPTION

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

"Unique identifier" and "unique identifier reader" as used herein refer to components of an automatic identification and data capture system. Suitable unique identifiers include, but are not limited to, bar codes (including one-dimensional and two-dimensional bar codes (QR codes)), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Such unique identifiers can be mounted on a container for resins for distribution from a resin provider to an end user, as discussed further below.

"Information storage media" as used herein may be any of the same devices described above in connection with "unique identifier," except used to store resin characteristics or modified operating instructions, as opposed to a resin unique identity, as discussed below.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Stereolithography Apparatus and Resins.

Resins for additive manufacturing are known and described in, for example, DeSimone et al., U.S. Pat. Nos. 9,211,678; 9,205,601; and 9,216,546. Dual cure resins for additive manufacturing are known and described in, for example, Rolland et al., U.S. Pat. Nos. 9,676,963; 9,598,606; and 9,453,142. Non-limiting examples of dual cure resins include, but are not limited to, resins for producing objects comprised of polymers such as polyurethane, polyurea, and copolymers thereof; objects comprised of epoxy; objects comprised of cyanate ester; objects comprised of silicone, etc.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out particular embodiments of CLIP include, but are not limited to: Batchelder et al., Continuous liquid interface production system with viscosity pump, U.S. Patent Application Pub. No. US 2017/0129169 (May 11, 2017); Sun and Lichkus, Three-dimensional fabricating system for rapidly producing objects, U.S. Patent Application Pub. No. US 2016/0288376 (Oct. 6, 2016); Willis et al., 3d print adhesion reduction during cure process, U.S. Patent Application Pub. No. US 2015/0360419 (Dec. 17, 2015); Lin et al., Intelligent 3d printing through optimization of 3d print parameters, US Patent Application Pub. No. U.S. 2015/0331402 (Nov. 19, 2015); and D. Castanon, Stereolithography System, U.S. Patent Application Pub. No. US 2017/0129167 (May 11, 2017).

After the object is formed, it is typically cleaned, and then further cured, preferably by baking (although further curing may in some embodiments be concurrent with the first cure, or may be by different mechanisms such as contacting to water, as described in U.S. Pat. No. 9,453,142 to Rolland et al.).

2. Methods and Apparatus Employing Micro-Led Arrays.

Figure 1:
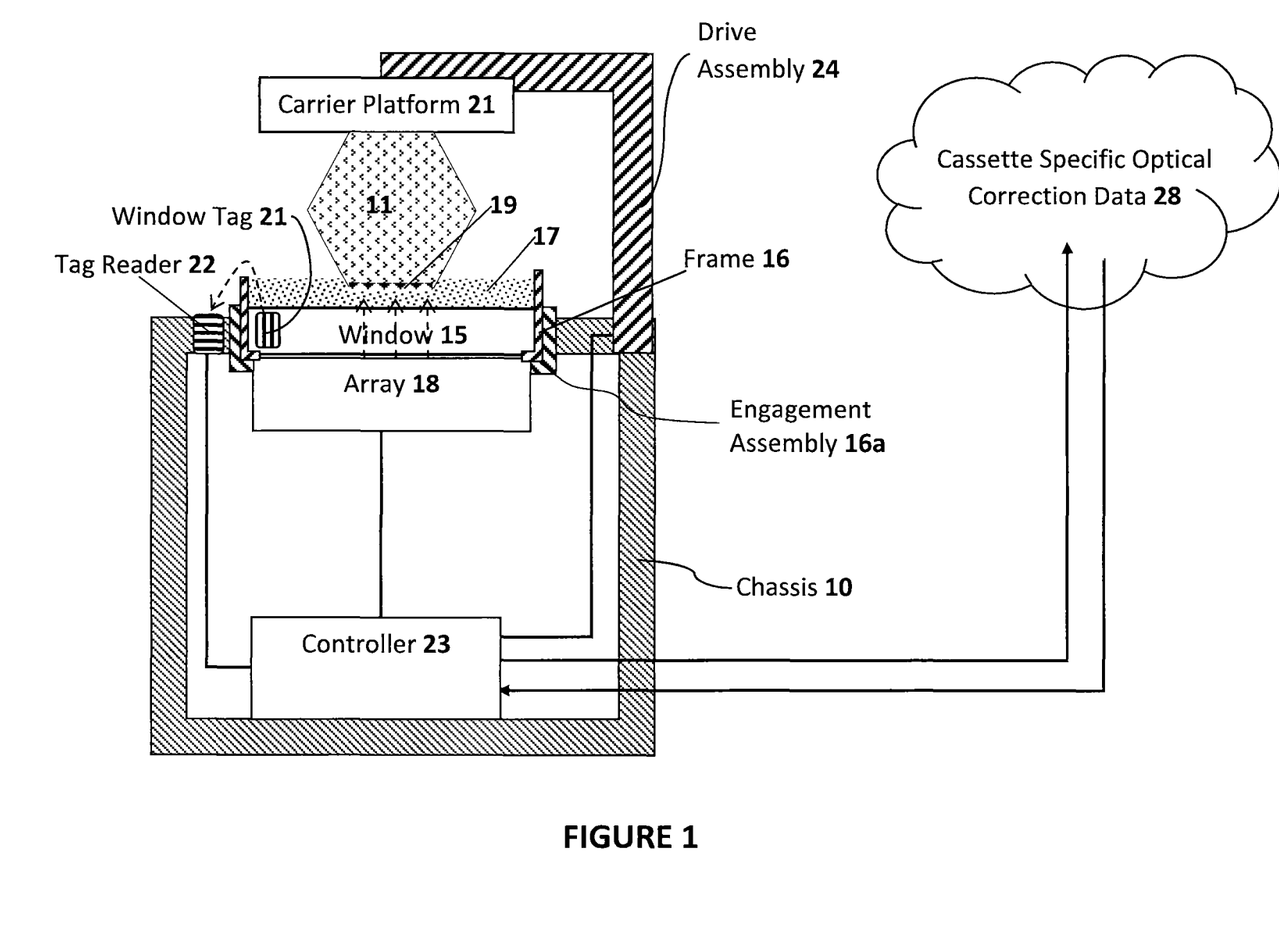
FIG. 1 schematically illustrates one embodiment an apparatus and method of the present invention.

As noted above, the present invention provides a stereolithography apparatus as illustrated in the non-limiting Examples of FIG. 1. The apparatus generally includes an optically transparent window 15 defining a build region in which a polymerizable resin 16 can be supported. The window may be comprised of a single layer of material, or multiple layers, and may contained in a frame 16 which can be removably connected to the apparatus, as discussed further below.

A carrier platform 21 is positioned above the window and removably connected to the drive assembly 24, which drive assembly 24 can be configured to advance the platform up and away from the window in the vertical, or z, direction. In an alternative embodiment (not shown), the drive assembly can be configured to lower the window down and away from the carrier platform, in accordance with known techniques.

A micro-LED or a vertical cavity surface emitting laser (VCSEL) source array 18 is positioned beneath the window (optionally in contact therewith), and is, along with drive assembly 24, operatively associated with controller 23. The controller is configured to carrying out production of object 11 from the resin 17 by a streolithography process such as CLIP (in which case, the object is produced at a liquid interface 19).

The array 18 and window 15 are preferably configured together to provide a resolution (to the resin 17 contacting the window during light polymerization thereof) of (i) from 100, 200, 400, 600 or 800 pixels per inch (ppi), to 2000 or 3000 ppi, or more, or (ii) from 40, 80, 160, 240, or 310 pixels per centimeter (ppcm) to 800 or 1200 ppcm, or more.

In some embodiments, the apparatus may be configured according to any of the following: (i) the source array 18 is positioned to project directly through the window 15 into a build region of a polymerizable resin on the window; (ii) the apparatus further comprises an optical array through which the source array projects (e.g., a lenslet array; a collimating lens array, a Fresnel lens array, and/or a diffractive optical element array; etc.) (and optionally with each individual element of the optical array corresponding 1 to 1 to each individual element of the source array); (iii) a projection lens is positioned between the source array 18 and the window 15 (e.g., the projection lens configured to steer light from the source array 18 into corresponding regions of the polymerizable resin); (iv) a steerable mirror operatively associated with a VCSEL array and configured to project light from the source into a build region of a polymerizable resin on the window, (e.g., with the steerable mirror configured to direct the beam from the VCSEL array to specific subregions of the build region in a sequential manner); (v) a steerable mirror and a projection lens operatively associated with a micro-LED array, and configured so that the light from the source is rendered telecentric by the projection lens, with the steerable mirror configured to project light from the source into a build region of a polymerizable resin on the window (e.g., with the steerable mirror configured to direct the beam from the micro-LED array to specific subregions of the build region in a sequential manner); and (vi) a combination of any of the foregoing.

Any suitable micro-LED array may be used in the present invention. Such arrays are known, and examples include, but are not limited to, those described in Micro-LED arrays are known and described in, for example: A. Bibl et al., Light emitting diode display with redundancy scheme, U.S. Pat. No. 9,865,832 (Apple); C. Percival, Methods and apparatus for improving micro-LED devices, U.S. Pat. No. 9,812,494 (Oculus VR); P. Maaskant et al., Micro-LED array with filters, U.S. Pat. No. 9,515,238 (Oculus VR); P. Chang, Micro-light-emitting diode, U.S. Pat. No. 9,433,050 (Mikro Mesa Technology); K. Sakariya et al., Active matrix emissive micro LED display, U.S. Pat. No. 9,343,448 (LuxVue Technology); A. Bibl and K. McGroddy, LED display with wavelength conversion layer, U.S. Pat. No. 9,111,464 (LuxVue Technology); A. Bibl et al., Light emitting diode structure, U.S. Pat. No. 8,852,436 (LuxVue Technology); A. Bibl et al., Micro light emitting diode, U.S. Pat. No. 8,809,875 (LuxVue Technology); Z. Fan et al., Micro-emitter array based full-color micro-display, U.S. Pat. No. 8,058,663 (III-N Technology); and H. Jiang et al., Micro-size LED and detector arrays for minidisplay, hyper-bright light emitting diodes, lighting, and UV detector and imaging sensor applications, U.S. Pat. No. 6,410,940 (Kansas State University), the disclosures of which are incorporated by reference herein in their entirety.

VCSEL arrays are known and described in, for example, Dudley and Tersigni, U.S. Patent Application No. US 2018/0215092 (Published Aug. 2, 2018), and are available from Phillips Photonic (acquired in April 2019 by TRUMPF Inc., Farmington Industrial Park, Conn. 06032 Farmington, United States) and from Vixar Inc., 2950 Xenium Lane, Suite 104, Polymouth, Minn. 55441 USA).

In some (currently preferred) embodiments, at least the top layer of window, contacting the polymerisable resin 17, is permeable to an inhibitor of polymerization, such as oxygen. In some embodiments, the window comprises an inorganic lower support (e.g., glass, sapphire, etc.) and an organic polymer (e.g., a fluoropolymer) layer on the support.

In some embodiments, additional layers including adhesives, channels for oxygen supply, etc., may be included as desired, such as described in B. Feller et al., *Three dimensional printing with build plates having reduced pressure and/or channels for increased fluid flow*, PCT Publication No. WO 2018/006029 (4 Jan. 2018); and B. Feller et al., *Three-dimensional printing method and apparatus for reducing bubbles by de-gassing through build plate*, PCT Publication No. WO 2018/006018 (4 Jan. 2018).

In some embodiments, the window may have an omniphobic surface coating thereon, for contacting the polymerizable resin (see, e.g., M. Boban et al., *ACS Appl. Mater. Intefaces* 10, 11406-11413 (2018); A. Tuteja et al., *PNAS* 105, 18200-18205 (2008); G. Allen, U.S. Patent Application Pub. No. US20180057692; R. Langer et al., U.S. Patent Application Pub. No. US20170266931; and T. Aytug, U.S. Patent Application Pub. No. US 20150239772).

Additional examples of windows that can be used to carry out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. U.S. 2016/0046075 to J. DeSimone, A. Ermoshkin et al.; U.S. 2016/0193786 to D. Moore, A. Ermoshkin et al.; U.S. 2016/0200052 to D. Moore, J. Tumbleston et al.; and U.S. 2016/0288376 to Sun and Lichkus; PCT Patent Application Publication Nos. 2016/123499 to D. Moore, J. Tumbleston et al; WO 2016/123506 to D. Moore, J. Tumbleston et al.; WO 2016/149097 to J. Tumbleston, E. Samulski et al.; WO 2016/149014 to J. Tumbleston, E. Samulski et al.; WO 2016/172783 to R. Fortier and D. Castanon; WO 2016/172788 to R. Fortier and D. Castanon; WO 2016/172804 to R. Fortier and D. Castanon; WO 2016/172805 to R. Fortier and D. Castanon; and WO 2015/164234 to L. Robeson, E. Samulski et al.; and others (the disclosures of all of which are incorporated by reference herein in their entirety).

3. Methods and Apparatus with Window Variability Correction.

The fine resolution that micro-LED arrays provide make them suitable for apparatus and methods in which the window is removable from the apparatus, different windows may have different properties, and optical correction by alteration of the image projected by the micro-LED array based on the particular window in place is desired.

The array and window are preferably configured together to provide a resolution of (i) from 100, 200, 400, 600 or 800 pixels per inch (ppi), to 2000 or 3000 ppi, or more, or (ii) from 40, 80, 160, 240, or 310 pixels per centimeter (ppcm) to 800 or 1200 ppcm, or more.

Accordingly, in the embodiment of FIG. 1, the controller 23 is operatively associated with a window unique identifier (or "tag") reader 22, which is positioned on the apparatus in a configuration to read from a window unique identifier or "tag") 21 (e.g., a QR code, a bar code, an NFC tag, an RFID tag, or the like, that is connected to the window cassette 12. The reader is operatively associated with the controller 12, which is in turn configured to transmit that unique identifier to a database (such as a cloud database 28) via the internet and receive cassette-specific optical correction instructions from that database, so that appropriate correction can be made locally, as discussed below. In an alternate embodiment (not illustrated), the window cassette further comprises a window data storage media, and the apparatus includes a media coupling. The storage media includes cassette-specific optical correction instructions. When secured to the apparatus, the storage media couples to the coupling, which in turn is operatively associated with controller, and which is in turn configured to download and receive cassette-specific optical correction instructions so that appropriate correction can be made locally, as discussed below.

While non-limiting examples of system architectures are given above, it will be appreciated that any of a variety of different architectures can be employed. Controllers can be a general purpose computer dedicated to, or on board, a particular apparatus; a local general purpose computer operatively associated with a group of machines via a local area network (or metropolitan area network); a remote general purpose computer operatively associated with machines via a wide area network or internet connection; and combinations thereof (for example, organized in a client-server architecture and/or distributed architecture). Likewise, data storage or memory can be on separate (volatile and/or non-volatile) memory devices located locally or remotely, partitioned sections of a single memory device, etc., including combinations thereof (e.g., a remote back-up memory in addition to a local memory). Peripheral devices for data entry and display can be implemented in any of a variety of ways known in the art, including typical keypad entry, video display, and printing apparatus, as well as graphical user interfaces such as touch-pads, touch-screens and the like, including smart-phone touch screens.

Figure 2A:
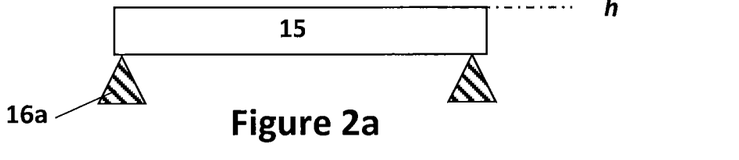
FIG. 2*a* is a side sectional, schematic, view of a window cassette, in which the height of the window is uniform.

A first set of example window optical properties for which optical correction instructions may be generated are given in FIGS. 2a-2d, and concern window height. In the embodiment of FIG. 2a, window height h is substantially uniform across the window cassette. For this situation, no window-specific instructions may be required, unless the height is greater or less than expected (as compared to an average or "standard" window. If the height is less than expected (and the window is hence closer to the light engine than expected, then the magnification of the projected light image may be increased. If the height is greater than expected, then the magnification of the projected light image can be increased.

Figure 2B:
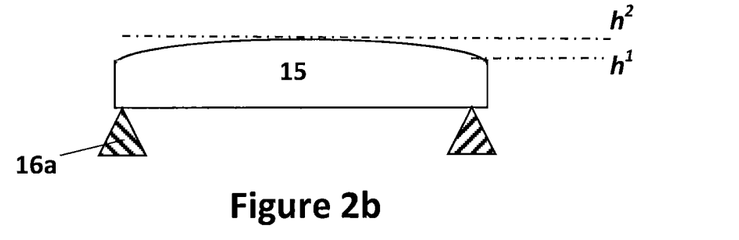
FIG. 2*b* is a side sectional, schematic, view of a window cassette, in which the height of the window is non-uniform due to window curvature.
Figure 3A:
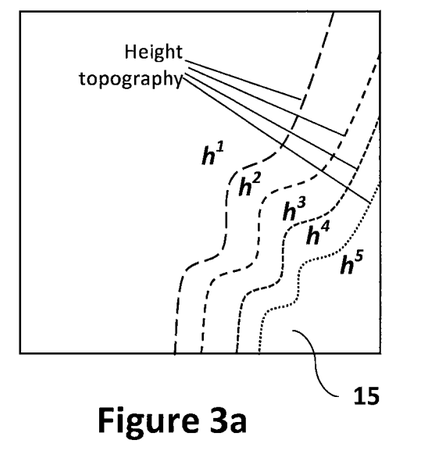
FIG. 3*a* is a top plan view of a window in which the height topography varies across five regions, from lowest ($h^1$) to highest ($h^5$).

In the embodiment of FIG. 2b, window height $h^1$ is lower in peripheral regions than in a central region $h^2$, and correction instructions as described in connection with FIG. 3a are required for those different regions.

Figure 2C:
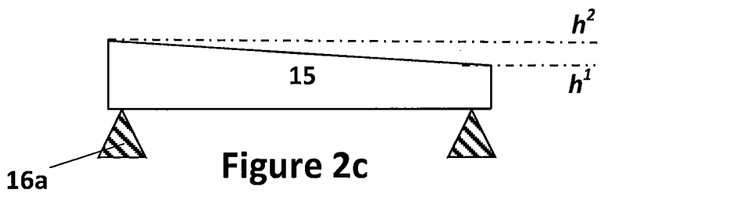
FIG. 2*c* is a side sectional, schematic, view of a window cassette, in which the height of the window is non-uniform due to thickness differences in the window.

In the embodiment of FIG. 2c, window height varies across the window due to a slant in the window, and correction instructions as described above are required for the regions of different height.

Figure 2D:
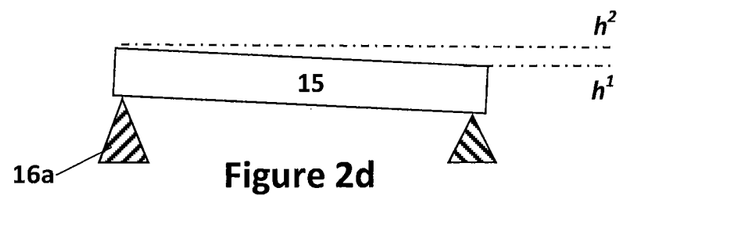
FIG. 2*d* is a side sectional, schematic, view of a window cassette, in which the height of the window is non-uniform due to height irregularities in the frame in which the window is mounted.

In the embodiment of FIG. 2d, window height varies across the window due to an irregularity in the window frame, and correction instructions as described above re required for the window regions consequently of different height.

Note that, while in FIGS. 2b-2d, two heights are given, for which corresponding correction instructions may be given, there may be three, four, five or more different height regions, as indicated by heights $h^1$, $h^2$, $h^3$, $h^4$, $h^5$ in the embodiment of FIG. 3a. Here, the corrective instructions may include decreased magnification of the projected light image for window regions that are further from the light engine, or increased magnification for regions that are closer to the light engine.

Figure 3B:
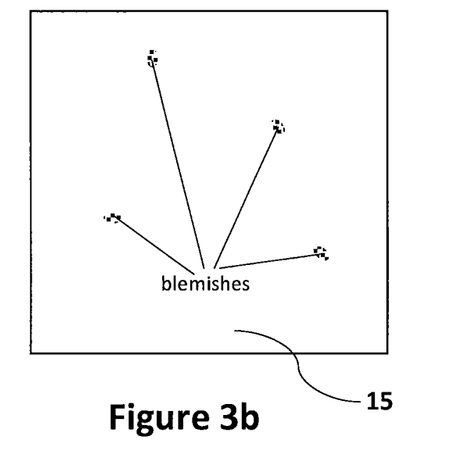
FIG. 3*b* is a top plan view of a window contains discrete regions of lesser transmissiveness (i.e., "blemishes").
Figure 3C:
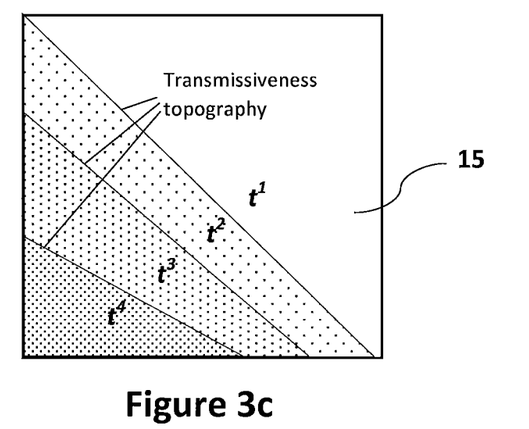
FIG. 3*c* is a top plan view of a window in which the transmissiveness topography varies across four regions, from most transmissive ($t^1$) to least transmissive ($t^4$).

FIG. 3b schematically represents a window with a plurality of discrete regions of lesser light transmissiveness relative to surrounding regions of the window (i.e., blemishes), and FIG. 3c represents a window with a progressive gradient of decreasing light transmissiveness, from $t^1$ through $t^2$, $t^3$ to $t^4$. Again, the corrective instructions may include increased light intensity for regions of lesser light transmissiveness.

Figure 3D:
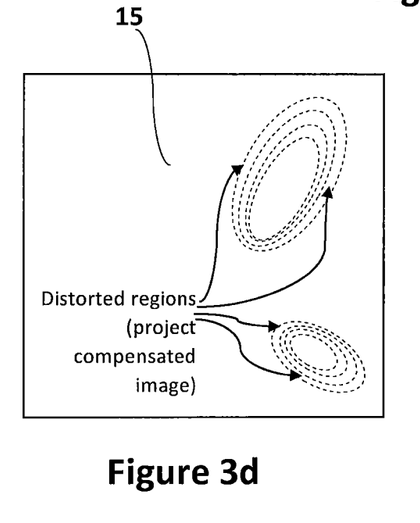
FIG. 3*d* is a top plan view of a window containing two optical distortion regions (that is, regions in which an image projected therethrough a distorted, as compared to the remaining regions of the window).

FIG. 3d schematically represents a window with regions that distort an optical image. Here, the correction instructions can include corresponding or reciprocal distortions of the projected image that are mapped to the distorted region(s) so that the image reaching the build region through the distorted region(s) is correct.

Figure 3E:
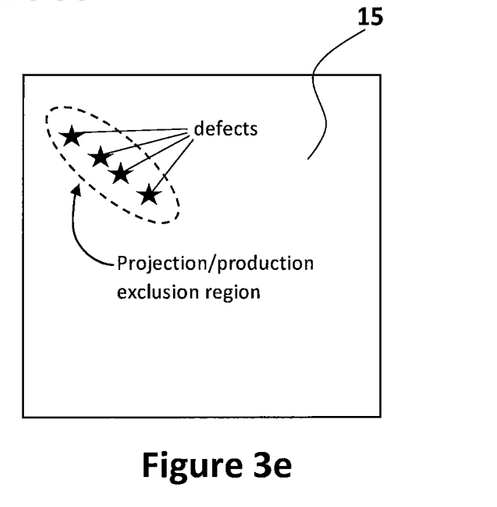
FIG. 3*e* is a top plan view of a window containing four defects, rendering the region of the window in which the defects are located unsuitable for the production of at least some objects (or at least some portions of some objects).

FIG. 3e schematically represents a window with regions that are so blemished, or so distorted, that any projected image through those regions would still result in unacceptable defects within objects produced therein (at least, within the tolerances specified for the particular objects being produced). Here, the corrective instructions may simply be defining an exclusion region, on which no objects are produced, or through which no light is projected, with images for objects being produced projecting elsewhere on the window (for example, where multiple objects are produced concurrently, they can be automatically arranged by the controller in a manner that does not utilize the exclusion region for projection).

Similar corrections can be made when the window is one that is semipermeable to an inhibitor of polymerization (e.g., oxygen), and the variable property is permeability, particularly reduced permeability, to that inhibitor. For example, when permeability (in a discrete region of the window, in a gradient across the window or in the entirety of the window) is less than expected (e.g., as compared to prior windows, an average of prior windows, or an actual or arbitrary standard window), then light intensity projected from the light engine can be reduced, speed of production (as carried out by the drive assembly) can be reduced, or a combination thereof. If permeability in some regions is too low to feasibly produce objects therein, then an exclusion region (like that described in connection with FIG. 3e above) can be created.

The foregoing is illustrative of the present invention, and is not to be construed as limiting thereof. The invention is defined by the following claims, with equivalents of the claims to be included therein.

We claim:

1. A method of making an object on a bottom-up stereolithography apparatus, the apparatus including a micro-LED or a vertical cavity surface emitting laser (VCSEL) source array, a drive assembly, and a controller operatively associated with said source array and said drive assembly, with the source array and/or the drive assembly having at least one adjustable parameter that is adjustable by said controller, the method comprising:
   (a) installing a removable window cassette on said apparatus in a configuration through which said micro-LED or VCSEL source array projects, said window cassette comprising an optically transparent member having a build surface on which an object can be produced, and with said optically transparent member having and at least one variable property therein; and then
   (b) modifying said at least one adjustable parameter by said controller based on said at least one variable property of said optically transparent member; and then
   (c) producing the object on said build surface from a light-polymerizable liquid by bottom-up stereolithography
   wherein said at least one variable property of said optically transparent member comprises at least one variable optical property.

2. A method of making an object on a bottom-up stereolithography apparatus, the apparatus including a micro-LED or a vertical cavity surface emitting laser (VCSEL) source array, a drive assembly, and a controller operatively associated with said source array and said drive assembly, with the source array and/or the drive assembly having at least one adjustable parameter that is adjustable by said controller, the method comprising:
   (a) installing a removable window cassette on said apparatus in a configuration through which said micro-LED or VCSEL source array projects, said window cassette comprising an optically transparent member having a build surface on which an object can be produced, and with said optically transparent member having and at least one variable property therein; and then
   (b) modifying said at least one adjustable parameter by said controller based on said at least one variable property of said optically transparent member; and then
   (c) producing the object on said build surface from a light-polymerizable liquid by bottom-up stereolithography, wherein:
   said window cassette includes a unique identifier operatively associated therewith, and
   said modifying step is carried out by:
      (i) detecting said unique identifier, and then
      (ii) transferring optical correction instructions for said at least one variable property of said optically transparent member and corresponding to said unique identifier from a data storage media to said controller.

3. The method of claim 1, wherein said window cassette includes a data storage media thereon, said data storage media containing optical correction instructions for said at least one variable property; and
   said modifying step is carried out by:
      (i) operatively associating said storage media with said controller and then
      (ii) transferring said optical correction instructions from said data storage media to said controller.

4. The method of claim 1, wherein said variable property comprises an optical property, a physical property, or a combination thereof.

5. The method of claim 1, wherein said variable property comprises window thickness or window height comprising a mechanical location of the top of the window when mounted on the apparatus, and said adjustable parameter comprises projected image magnification for the entirety of an image and/or portions thereof and/or source array focal plane.

6. The method of claim 1, wherein said variable property comprises light transmissiveness of said optically transparent member and said adjustable property comprises light intensity of said micro-LED or VCSEL source array.

7. The method of claim 1, wherein said variable property comprises an optical defect region of said optically transparent member, and said adjustable parameter comprises a projection region to said build surface.

8. The method of claim 1, wherein said variable property comprises regional optical distortions in said of said optically transparent member, and said adjustable parameter comprises regional optical corrections of the projected light image that are mapped to said regional optical distortions.

9. The method of claim 1, wherein said variable property comprises permeability to an inhibitor of polymerization of said optically transparent member, and said adjustable parameter comprises light intensity, speed of production, or a combination thereof.

10. The method of claim 1, wherein each said adjustable parameter is independently applied to one or more minor portions of said optically transparent member, a major portion of said of said optically transparent member, or the entirety of said of said optically transparent member, or a combination thereof.

11. The method of claim 1, wherein said optically transparent member comprises a plurality of distinct layers.

12. A method of making an object on a bottom-up stereolithography apparatus, the apparatus including a micro-LED or a vertical cavity surface emitting laser (VCSEL) source array, a drive assembly, and a controller operatively associated with said source array and said drive assembly, with the source array and/or the drive assembly having at least one adjustable parameter that is adjustable by said controller, the method comprising:

(a) installing a removable window cassette on said apparatus in a configuration through which said micro-LED or VCSEL source array projects, said window cassette comprising an optically transparent member having a build surface on which an object can be produced, and with said optically transparent member having and at least one variable property therein; and then (b) modifying said at least one adjustable parameter by said controller based on said at least one variable property of said optically transparent member; and then (c) producing the object on said build surface from a light-polymerizable liquid by bottom-up stereolithograph, wherein said optically transparent member comprises:

(i) a rigid or flexible, semi-permeable or impermeable, support member;

(ii) either a semipermeable member on said support member or an immiscible layer on said support member;

(iii) an inhibitor of polymerization in said semipermeable member when present;

(iv) optionally, a cushioning member between said impermeable support member and said semipermeable member; and (v) optionally, feed space between said impermeable support member and said semipermeable member, said feed space configured for supplying additional inhibitor of polymerization into said semipermeable member.

13. The method of claim 12, wherein said support member comprises a rigid or flexible, impermeable support member.

14. The method of claim 13, wherein said semipermeable member is on said support member.

15. The method of claim 14, wherein said inhibitor of polymerization is in said semipermeable member.

16. The method of claim 15, wherein said feed space is present between said impermeable member and said support member.

* * * * *

UNITED STATES PATENT AND TRADEMARK OFFICE
CERTIFICATE OF CORRECTION

PATENT NO. : 11,104,061 B2  
APPLICATION NO. : 15/733454  
DATED : August 31, 2021  
INVENTOR(S) : Chimmalgi et al.

Page 1 of 1

It is certified that error appears in the above-identified patent and that said Letters Patent is hereby corrected as shown below:

In the Specification

Column 4, Line 5: Please correct "(iii)" to read -- (iv) --

In the Claims

Column 12, Line 11, Claim 1: Please correct "having and at" to read -- having an at --

Column 12, Line 35, Claim 2: Please correct "having and at" to read -- having an at --

Column 13, Line 26, Claim 10: Please correct "portion of said of said optically" to read -- portion of said optically --

Column 13, Line 27, Claim 10: Please correct "entirety of said of said optically" to read -- entirety of said optically --

Column 14, Line 6, Claim 12: Please correct "having and at" to read -- having an at --

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*